May 31, 1932.  E. RICARD ET AL  1,860,512
MANUFACTURE OF ANHYDROUS ACETIC ACID
Filed Dec. 31, 1928
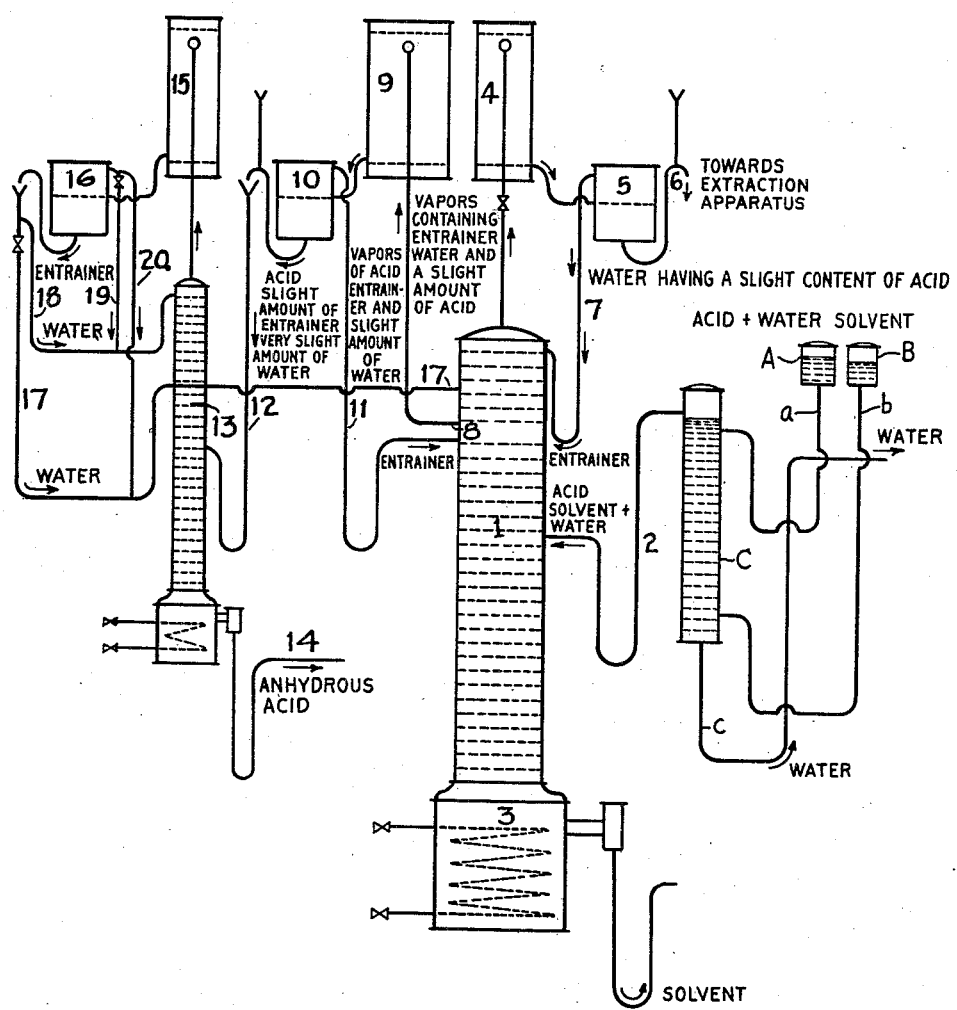

Patented May 31, 1932

1,860,512

UNITED STATES PATENT OFFICE

ELOI RICARD AND HENRI MARTIN GUINOT, OF MELLE, FRANCE, ASSIGNORS TO U. S. INDUSTRIAL ALCOHOL CO., OF NEW YORK, N. Y., A CORPORATION OF WEST VIRGINIA

MANUFACTURE OF ANHYDROUS ACETIC ACID

Application filed December 31, 1928, Serial No. 329,541, and in France May 19, 1928.

The extraction and concentration of acetic acid from aqueous solutions thereof by means of solvents sparingly soluble in water, has already been carried out in various ways.

In all cases, after the acid has been extracted by the solvent from the aqueous solution there is obtained a mixture composed of three bodies, solvent, acid and water, the solvent being generally in high proportion and the water in comparatively small proportion. The known processes may be grouped in two classes:—

The first class comprises processes in which are used solvents sufficiently volatile to be easily separated from acetic acid by ordinary distillation, the acid remaining as residue.

The second class comprises processes using solvents, the boiling point of which is sufficiently high to permit easy separation of the acetic acid by ordinary distillation, the acid being in this case the more volatile product and the solvent remaining as residue.

The present invention uses solvents or mixtures of solvents, of which the boiling point may be close to that of acetic acid or even identical therewith, the acid being separated by means of a new method from the mixture of the three bodies obtained in the extraction of the aqueous acetic acid.

This new method consists in distilling in a continuous manner the hydrated acetic acid solution formed by the said mixture, in a column having heating surfaces and charged once for all with a certain quantity of a liquid, herein called an entrainer, which has the property of being insoluble or little soluble in water and also capable of yielding with acetic acid a binary azeotropic mixture, homogeneous or not; this mixture being in all cases adapted for separation into two layers in the presence, or by addition, of a small proportion of water, the entrainer also yielding with water a second binary azeotropic mixture having a boiling point lower than that of the preceding mixture.

In the course of the said distillation the solvent becomes a tail product and is recovered in continuous manner from the lower part of the distillation column.

At the upper part of the column there is obtained the mixture of minimum boiling point formed from the entrainer and the water, which mixture is separable into two layers as already stated. After decantation the water is rejected or returned with the aqueous solution of acetic acid to be concentrated if it contains a little acid; the entrainer is returned in the ordinary manner at the upper part of the column.

At one side of the column above the point at which the column is fed with the mixture of the three bodies aforesaid, there is extracted an acid mixture, the composition of which is close to that of the binary azeotropic mixture formed by the entrainer and the acid. The mixture withdrawn contains a small proportion of water which may be varied by controlling the output and heating of the column; this small proportion of water ensures easy separation into two layers in every case. By decantation there is separated a layer composed of slightly hydrated acid containing in solution a small proportion of the entrainer. The other layer, consisting of the entrainer and a small proportion of acid, is returned to the column in the ordinary manner.

The layer of slightly hydrated acid is forwarded to a small column having a heated surface in order to be completely dehydrated. For this purpose the small column is charged with the same entrainer that is used in the principal column. The water is expelled from the summit of the small column in the form of a binary mixture of minimum boiling point with the entrainer, while from the lower part of the column the acid is recovered in a completely anhydrous condition. Since the liquid fed to this small column contains in solution a little of the entrainer, as indicated above, it is necessary to withdraw from the upper part of the small column a corresponding quantity to be returned to the principal column together with the aqueous layer, if that is too acid to be returned directly to the extraction system.

If it is not desired to produce a completely anhydrous acid but merely a concentrated acid, the slightly hydrated acid layer is freed from the small proportion of entrainer which it contains by continuous distillation in a small column having heating surfaces, the vapours from which are united with those derived from the lateral extraction from the principal column.

Instead of withdrawing a mixture of entrainer and water from the head of the column and a mixture of entrainer and acid from a point lower down, and separately condensing and decanting these mixtures as just described, for the purpose of obtaining in that manner a very concentrated or anhydrous acid, it is also within the scope of the invention to withdraw all the vapors at a single point at the head of the column. In this case there is distilled from the upper part of the principal column a mixture of water, acid and entrainer, from which the acid and water contained in solution in the feed liquor are separated in a decanting apparatus, where they form one of the layers, while the entrainer contained in the other layer in this apparatus is returned to the column in the ordinary manner. The layer consisting essentially of acid with a minor proportion of water may be withdrawn as a product, namely acid of a strength corresponding to the proportions, or it may be further concentrated or dehydrated by appropriate treatment.

The new mode of operating, which is the object of this invention, thus allows the use of a new class of solvents which have not been capable of use in previous processes. Among these solvents there are some, like butyl acetate, which have much practical importance.

The aqueous solution of acid from vessel A and the solvent from vessel B are supplied through pipes $a$ and $b$ to the extraction apparatus C. From the bottom of this apparatus, water passes out through the pipe $c$. The extract mixture passes through the pipe 2.

The method is equally important from the point of view of consumption of steam, for it must be observed that the acid is only vaporized together with a comparatively small quantity of water. As to the regenerated solvent itself, de-acidification is complete, so that it has its maximum efficiency in further use for the extraction of the aqueous acetic acid.

Finally, the temperatures necessary for heating the several columns are not high, for example of the order of 100°–150° C., which is a great advantage over certain former processes, which needed the use of a vacuum or of a temperature of the order of 180°–200° C.

The following example, in which reference is made to the accompanying diagram, will serve to illustrate the invention.

The example of the process described consists in extracting an aqueous solution of acetic acid of 30 per cent. strength by means of butyl acetate and recovery of substantially anhydrous acetic acid.

By the extraction of the acetic acid solution with the butyl acetate there is obtained a mixture having approximately the following composition.

| | Per cent | |
|---|---|---|
| Butyl acetate | 78.5 | Corresponding with an acid of 76.2 per cent. strength. |
| Acetic acid | 16 | |
| Water | 5.5 | |

This mixture, in vessel A, is introduced by pipe 2 into a column 1 containing plates and heated by a closed coil 3; this column is charged preliminarily and once for all with a suitable quantity of an entrainer consisting of a mixture of petroleum hydrocarbons boiling between narrow limits, for instance between 99° and 101° C.

Anhydrous acetic acid forms with this petrol, for example, a homogeneous binary azeotropic mixture boiling at 94° C. and containing 30 per cent. of acid.

The same petrol gives with water a binary mixture of minimum boiling point containing 10 per cent. of water and boiling at 80° C.

In the course of the distillation the acid and water contained in the feed liquor are carried towards the upper plates of the column 1. From the summit of the column there is removed a suitable quantity of the vapour which is condensed in a condenser 4, the condensate flowing to the decanting apparatus 5.

The lower layer in the latter consists of water containing a small proportion of acetic acid. It is returned through pipe 6 to a suitable part of the extraction apparatus. The upper layer consisting of the entrainer in nearly pure state is returned to the top of the column by pipe 7.

At a place below some of the top plates of the column, for instance at 8, there is withdrawn a quantity of vapour sufficient for extracting nearly the whole of the acetic acid in the form of a binary mixture of petrol and acid, this mixture containing at the same time a little water to ensure satisfactory separation into layers, which occurs in the decanting apparatus 10 after the vapours have passed through the condenser 9. The upper layer, containing principally the entrainer, is returned to the principal column by the pipe 11; the lower layer consisting of acid of 90–99 per cent. strength, containing a small quantity of petrol in solution, is forwarded by pipe 12 to a small column 13 having a heating surface and charged once for all with a suitable quantity of the petrol destined to act as the entrainer of the water.

The vapours issuing from the small column 13 are condensed in the condenser 15 and flow into the decanting apparatus 16, where two layers are formed. A part of the aqueous layer is returned through pipe 18 to the small column 13 to prevent, as far as possible, the acetic acid from rising to the summit of the column, the other part (corresponding with the water in the feed liquor) is returned through pipe 17 to the principal column 1. The upper layer consists principally of entrainer and is returned to the circuit partly through pipe 19 which takes it to a small column 13 and partly (corresponding with the petrol dissolved in the feed liquor) by the pipes 20 and 17 to the principal column 1.

Under these conditions the acetic acid, already very concentrated, introduced through pipe 12, becomes dehydrated and freed from petrol which it contains in solution while descending the plates of the small column, and acid, strictly anhydrous, is recovered from the lower part of the column through pipe 14.

The butyl acetate entering the principal column 1 descends from plate to plate of the column yielding its acid to the petrol with which the plates are more or less covered. Owing to its boiling point, 125° C., its separation is easy and it is recovered in a pure condition at the lower part of the column 1; it may be used again indefinitely in the cycle.

In the apparatus here indicated by way of example, modifications of detail may be made without departing from the invention, since the latter is concerned with the general principles involved. The invention may be operated at a pressure other than atmospheric pressure for the purpose, for instance, of realizing better conditions of azeotropic entrainment for obtaining certain recovery of heat by heating a column by the latent heat in the vapours from another column.

In the claims it is to be understood that "solvent" includes either single substances or mixtures of solvents, and similarly that "entrainer" includes either single substances or mixtures.

What we claim is:

1. A process for continuously concentrating aqueous solutions of acetic acid, wherein the acid is first extracted from the aqueous solution by solvent action and the resulting mixture of acid, solvent and residual water is subjected to fractional distillation in the presence of an entrainer insoluble or sparingly soluble in water and capable of yielding with acetic acid a mixture having a minimum boiling point, the water and acid being obtained as head products and the solvent as a tail product.

2. A process for continuously concentrating aqueous solutions of acetic acid, wherein the acid is first extracted from the aqueous solution by means of a solvent the boiling point of which is close to that of acetic acid and the resulting mixture of acid, solvent and residual water is subjected to fractional distillation in the presence of an entrainer insoluble or sparingly soluble in water and capable of yielding with acetic acid a mixture having a minimum boiling point, the water and acid being obtained as head products and the solvent as a tail product.

3. A process for continuously concentrating aqueous solutions of acetic acid, wherein the acid is first extracted from the aqueous solution by solvent action and the resulting mixture of acid, solvent and residual water is subjected to fractional distillation in the presence of an entrainer comprising a hydrocarbon or hydrocarbons insoluble or sparingly soluble in water and capable of yielding with acetic acid a mixture having a minimum boiling point, the water and acid being obtained as head products and the solvent as a tail product.

4. A process for continuously concentrating aqueous solutions of acetic acid, wherein the acid is first extracted from the aqueous solution by means of a solvent the boiling point of which is close to that of acetic acid and the resulting mixture of acid, solvent and residual water is subjected to fractional distillation in the presence of an entrainer comprising a hydrocarbon or hydrocarbons insoluble or sparingly soluble in water and capable of yielding with acetic acid a mixture having a minimum boiling point, the water and acid being obtained as head products and the solvent as a tail product.

5. A process for continuously concentrating aqueous solutions of acetic acid, which comprises extracting the acid from the aqueous solution by solvent action, then subjecting the resulting mixture of acid, solvent and residual water to fractional distillation in the presence of an entrainer insoluble or sparingly soluble in water and capable of yielding with acetic acid a mixture having a minimum boiling point, withdrawing the solvent as a tail product, removing from the still a mixture containing essentially acetic acid and entrainer, producing the separation of this mixture into layers, returning the layer containing the entrainer to the still, and withdrawing the concentrated acid which constitutes the other layer.

6. A process for continuously concentrating aqueous solutions of acetic acid, which comprises extracting the acid from the aqueous solution by solvent action, then subjecting the resulting mixture of acid, solvent and residual water to fractional distillation in the presence of an entrainer insoluble or sparingly soluble in water and capable of yielding with acetic acid a mixture having a minimum boiling point, withdrawing the solvent as a tail product, removing from the still a mixture containing essentially acetic acid and entrainer, producing the separation of this mixture into layers with the aid of a slight quantity of water, returning the layer containing the entrainer to the still, and withdrawing the concentrated acid which constitutes the other layer.

7. A process for continuously concentrating aqueous solutions of acetic acid, which comprises extracting the acid from the aqueous solution by solvent action, then subjecting the resulting mixture of acid, solvent and residual water to fractional distillation in the presence of an entrainer insoluble or sparingly soluble in water and capable of yielding with acetic acid a mixture having a minimum boiling point, withdrawing the solvent as a tail product, removing from the still a mixture of acetic acid and entrainer with a slight amount of water, producing the separation of this mixture into layers with the aid of the water in the mixture, returning to the still the layer containing the entrainer, and withdrawing the concentrated acid which constitutes the other layer.

8. A process for continuously concentrating aqueous solutions of acetic acid, which comprises extracting the acid from the aqueous solution by solvent action, then subjecting the resulting mixture of acid, solvent and residual water to fractional distillation in the presence of an entrainer insoluble or sparingly soluble in water and capable of yielding with acetic acid a mixture having a minimum boiling point, withdrawing the solvent as a tail product, removing from the still a mixture containing essentially acetic acid and entrainer, producing the separation of this mixture into layers with the addition of a slight quantity of water, returning to the still the layer containing the entrainer, and withdrawing the concentrated acid which constitutes the other layer.

9. A process for continuously concentrating aqueous solutions of acetic acid, which comprises extracting the acid from the aqueous solution by solvent action, then subjecting the resulting mixture of acid, solvent and residual water to fractional distillation in the presence of an entrainer insoluble or sparingly soluble in water and capable of yielding with acetic acid a mixture having a minimum boiling point, withdrawing the solvent as a tail product, removing the vapor of a mixture the composition of which is very close to that of the binary azeotropic mixture, condensing said vapor and causing the condensate to separate into layers, returning the layer containing the entrainer to the still, and withdrawing the concentrated acid which constitutes the other layer.

10. A process for continuously concentrating aqueous solutions of acetic acid, which comprises extracting the acid from the aqueous solution by solvent action, then subjecting the resulting mixture of acid, solvent and residual water to fractional distillation in the presence of an entrainer insoluble or sparingly soluble in water and capable of yielding with acetic acid a mixture having a minimum boiling point, withdrawing the solvent as a tail product, removing from the still the vapor of a mixture of entrainer and water, condensing this vapor and decanting the condensate, removing from the still at a lower point a mixture of acid and entrainer, decanting this mixture, returning to the still the layers containing the entrainer, and withdrawing the concentrated acid which constitutes the other layer obtained from the latter mixture.

11. A process for continuously concentrating aqueous solutions of acetic acid, which comprises extracting the acid from the aqueous solution by solvent action, then subjecting the resulting mixture of acid, solvent and residual water to fractional distillation in the presence of an entrainer insoluble or sparingly soluble in water and capable of yielding with acetic acid a mixture having a minimum boiling point, withdrawing the solvent as a tail product, removing from the head of the still a mixture of entrainer and water, condensing this vapor and decanting the condensate, removing from the still at a lower point the vapor of a mixture the composition of which is very close to that of the binary azeotropic mixture of acid and entrainer, condensing and decanting this mixture, returning to the still the layers containing the entrainer, and withdrawing the concentrated acid which constitutes the other layer obtained from the latter mixture.

12. A process for continuously concentrating aqueous solutions of acetic acid, which comprises extracting the acid from the aqueous solution by solvent action, then subjecting the resulting mixture of acid, solvent and residual water to fractional distillation in the presence of an entrainer insoluble or sparingly soluble in water and capable of yielding with acetic acid a mixture having a minimum boiling point, withdrawing the solvent as a tail product, removing from the still a mixture containing essentially acetic acid and entrainer, producing the separation of this mixture into layers, returning the layer containing the entrainer to the still, withdrawing the concentrated acid which constitutes the other layer, and distilling this concentrated acid in the presence of an entrainer for the water to obtain the acid in substantially pure and anhydrous state.

In testimony whereof we have signed this specification.

ELOI RICARD.
HENRI MARTIN GUINOT.